(12) United States Patent
Boggs et al.

(10) Patent No.: US 6,494,277 B1
(45) Date of Patent: Dec. 17, 2002

(54) HYBRID ELECTRIC VEHICLE SYSTEM

(75) Inventors: David Lee Boggs, Bloomfield Hills, MI (US); Stephen Richard Burke, Waterford, MI (US); Stephen John Kotre, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 13 days.

(21) Appl. No.: 09/710,522

(22) Filed: Nov. 9, 2000

(51) Int. Cl.[7] .................................................. B60R 6/00
(52) U.S. Cl. ...................... 180/65.2; 180/65.8; 701/22
(58) Field of Search ............................ 180/65.2, 65.1, 180/65.4, 65.8; 123/179.28, 179.29, 179.3; 701/22

(56) References Cited

U.S. PATENT DOCUMENTS

| | | | |
|---|---|---|---|
| 4,335,429 A | * | 6/1982 | Kawakatsu ................ 364/424 |
| 5,540,202 A | | 7/1996 | Cullen et al. |
| 5,626,117 A | | 5/1997 | Wright |
| 5,632,238 A | | 5/1997 | Furukawa et al |
| 5,865,263 A | | 2/1999 | Yamaguchi et al. |
| 5,909,720 A | * | 6/1999 | Yamaoka et al. ......... 123/179.3 |
| 6,006,725 A | | 12/1999 | Stefanopoulou et al. |
| 6,054,776 A | * | 4/2000 | Sumi ........................... 290/17 |
| RE36,737 E | | 6/2000 | Brehob et al. |
| 6,077,186 A | * | 6/2000 | Kojima et al. ............. 180/65.2 |
| 6,085,729 A | | 6/2000 | Kondo et al. |
| 6,186,124 B1 | | 2/2001 | Stefanopoulou et al. |
| 6,209,672 B1 | * | 4/2001 | Severinsky ................ 180/65.2 |
| 6,247,437 B1 | * | 6/2001 | Yamaguchi et al. ........ 180/65.2 |
| 6,274,943 B1 | * | 8/2001 | Hasegawa et al. ......... 290/40 C |
| 6,335,574 B1 | * | 1/2002 | Ochiai et al. ............. 290/40 C |
| 6,338,391 B1 | * | 1/2002 | Severinsky et al. ........ 180/65.2 |

FOREIGN PATENT DOCUMENTS

| | | |
|---|---|---|
| EP | 1093951 | 4/2001 |
| EP | 1125781 | 8/2001 |
| EP | 1143134 | 10/2001 |
| EP | 1152103 | 12/2001 |
| EP | 0781680 | 6/2002 |

* cited by examiner

Primary Examiner—Brian L. Johnson
Assistant Examiner—Christopher Bottorff
(74) Attorney, Agent, or Firm—Carlos L. Hanze

(57) ABSTRACT

A method of determining an operating state of an internal combustion engine in a hybrid electric vehicle drive system comprising an internal combustion engine having an output shaft which is coupled to a generator. The engine includes a fuel injector responsive to a fuel command. The method comprises the steps of determining an ON/OFF status of the fuel command and determining the generator torque. The generator torque provides an indication of the actual engine torque. An engine running flag is set ON when the fuel command is ON and the generator torque value is greater than a predetermined value. Otherwise, the engine running flag is set OFF.

14 Claims, 2 Drawing Sheets

HYBRID ELECTRIC VEHICLE SYSTEM

TECHNICAL FIELD

The present invention relates generally to internal combustion engines for automotive vehicles, and more specifically, to an automotive vehicle having a motor/generator coupled to the engine. Further, the present invention relates, in particular, to a method for determining that the engine is producing torque in a hybrid electric vehicle.

BACKGROUND

Hybrid electric vehicles ("HEVs") utilize both an internal combustion engine and one or more electric machines (e.g., motors/generators) to generate power and torque. The electric motor/generator within a hybrid electric vehicle provides the vehicle with additional degrees of freedom in delivering the driver-demanded wheel torque and may also be used to control the speed of the engine.

In one type of hybrid electric vehicle, commonly referred to as a "power split" configuration, the electric generator and the internal combustion engine are interconnected by use of a planetary gear set, and the electric generator selectively provides a reaction torque which may be used to control the speed of the engine.

During initial startup of the vehicle, the motor/generator functions as a starter. While functioning as a starter, the motor/generator provides a sufficient amount of starting torque to rotate the crankshaft of the engine before the cylinders are fired. After the engine is fired, an amount of engine torque is provided to the crankshaft from the combustion process in the cylinders. Once the engine is running, the motor/generator functions as a generator in which electric power is generated by the output rotation of the engine. This power is then used to charge the electrical system of the vehicle including an energy storage device which, in turn, is used to drive a traction motor.

In foreseeable automotive applications, the engine may be shut down during vehicle stops or other operating conditions. Thus, many startups could occur over the course of a trip. In such applications, the vehicle system controller requires a reliable indication that the engine has started and is running before making torque requests of the engine controller.

SUMMARY OF THE INVENTION

It is therefore an object of the invention to provide an improved hybrid electric vehicle system. It is another object to provide a reliable engine running indicator before torque requests are made of the engine.

In one aspect of the invention, a method of determining an operating state of an internal combustion engine in a hybrid electric vehicle drive system is provided. The HEV system comprises an internal combustion engine coupled to a generator. The engine includes fuel injectors responsive to a fuel command. The method comprises the steps of determining an ON/OFF status of the fuel command and determining the generator torque. The generator torque provides an indication of the actual engine torque. An engine running flag is set ON when the fuel command is ON and the generator torque value is above a predetermined value. Otherwise, the engine running flag is set OFF.

In a further aspect of the invention, the actual engine torque as derived from the generator torque is compared to a commanded engine torque value. An engine running flag is set ON when the fuel command is ON and the difference between the actual and commanded engine torques is less than a predetermined value.

One advantage of the invention is that the vehicle system controller has a reliable indication that the engine has started and is running before torque requests are made of the engine.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
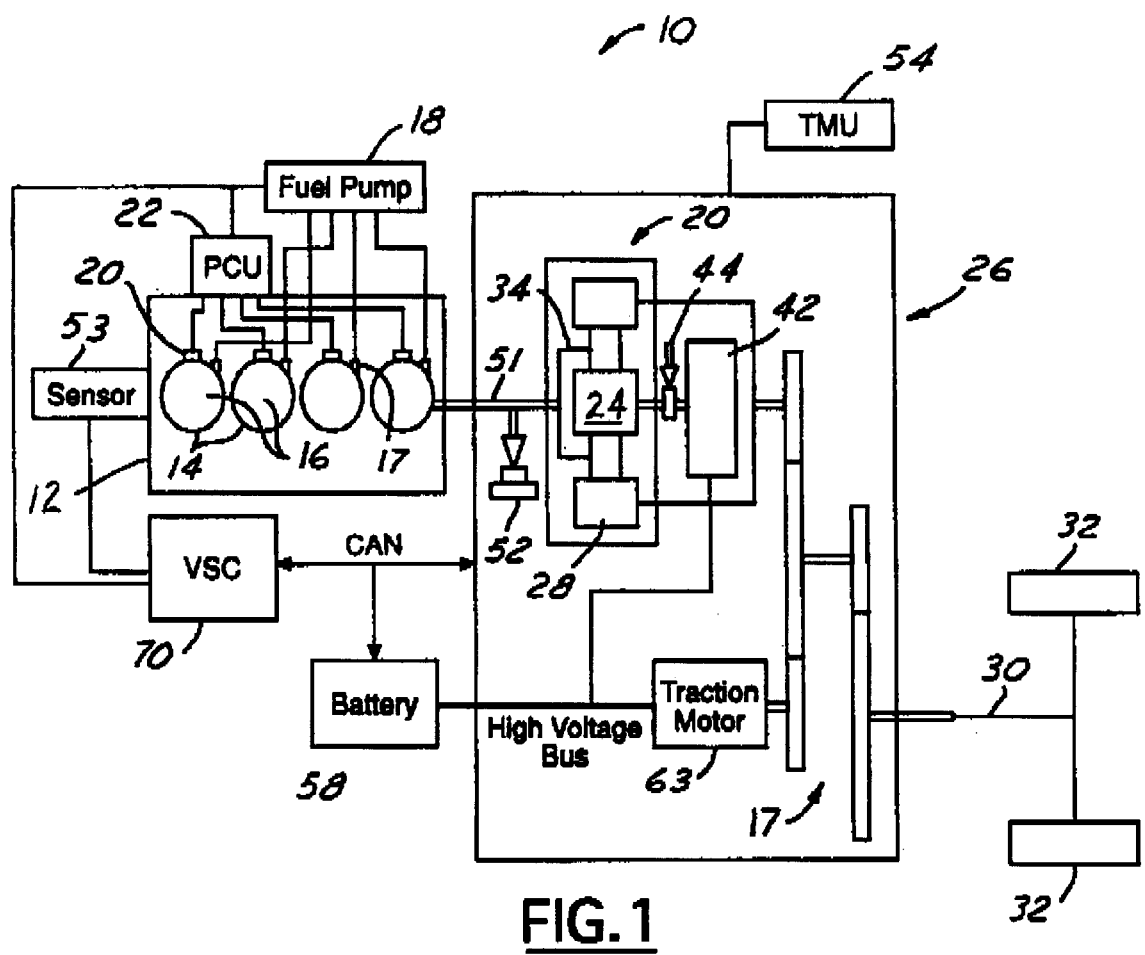
FIG. 1 is a schematic view of the drive system of a hybrid electric vehicle wherein the present invention may be used to advantage.

Referring now to FIG. 1, a hybrid electric vehicle 10 is illustrated having an internal combustion engine 12, an electric motor/generator 42, and an electric traction motor 63. The internal combustion engine 12 includes cylinders 14 with pistons 16 located therein. Each cylinder 14 is coupled to a fuel pump 18 through fuel lines and a fuel injector 17 or other fuel delivery system. Each cylinder 14 also has a spark plug 20 or other ignition source coupled to a powertrain control unit. A powertrain control unit (PCU) 22 controls the ignition timing and fuel delivery operation in a conventional manner subject to the improvements of the present invention. The configuration of FIG. 1 is illustrative of an HEV system wherein the present invention may be used to advantage. The present invention, however, is applicable to any HEV that has the capability of stopping the engine while the controllers are kept operational.

The configuration of FIG. 1 is referred to as a "power-split" configuration wherein a planetary gearset 20 within transaxle 26 couples the engine 12, motor/generator 42, and traction motor 63. The engine 12 is connected to the carrier 34, the motor/generator 42 is connected to the sun gear 24, and the traction motor 63 is connected to the ring gear 28 via an additional gearset 17. The driveline 30 of transaxle 26 then provides power to the wheels 32. Of course, the present invention is also applicable to four wheel drive systems in which all of the wheels 32 are driven.

The drive system 10 further includes a conventional one-way clutch 52 that selectively and operatively engages and disengages the output shaft 51 of the engine 12. The drive system also includes a brake and clutch assembly 44 that selectively and operatively engages the rotor (not shown) of motor/generator 42.

Planetary gearset 20 allows the engine 12 and generator 42 to cooperate as a single power source which provides a single power or torque output from the ring gear of the planetary gearset 20 to the driveline 30. It should be further appreciated that the planetary gearset 20 serves as a power split device that splits the output from engine 12 to the generator 42 and to the driveline 30. Generator 42 selectively provides a negative reaction torque to the engine-produced torque, thereby controlling the engine speed. By doing so, generator 42 converts rotational energy to electrical energy which is stored within the energy storage device 58 and which can be used to power the motor 63 and various other electrical components of the vehicle.

As will be further described below, motor/generator 42 is used as a starter during engine startup and as a generator (alternator) to supply power to recharge the batteries of the vehicle.

The planetary gearset transaxle 26 has a transaxle management unit (TMU) 54 that commands the generator 42 and electric traction motor 63. A vehicle system controller (VSC) 70 communicates with the PCU 22 and TMU 54 over a controller area network (CAN) and dictates the overall vehicle operating modes and how best to deliver the driver requested wheel torque. The powertrain controller 22 and vehicle system controller 70 may in practice be contained in a single module.

A conventional energy storage device 58 comprising one or more batteries or other charge storage device is electrically coupled to generator 42 and traction motor 63. Electrical energy storage device 58 receives and provides power from/to generator 42 and traction motor 63 via high voltage bus.

The electric traction motor 63 is a conventional electric motor which acts as a "third power source" that provides torque and power to the vehicle's drive line independently from the other power sources (i.e., engine 12 and generator 42). In this manner, the three power sources (i.e., the internal combustion engine 12, generator 42, and the electric traction motor 63) cooperatively deliver torque and power to the vehicle simultaneously and independently. The electric motor 63 further converts drivetrain energy into electrical energy by operating as a generator during regenerative braking.

In the preferred embodiment of the invention, the vehicle system controller (VSC) 70 is electrically and communicatively coupled to conventional user or driver operated controls or components and to one or more conventional vehicle operating condition sensors 53. Controller 70 receives signals and/or commands generated by driver inputs and vehicle operating condition sensors 53 (e.g., gear selection, accelerator position, braking effort commands, engine speed), and processes and utilizes the received signals to determine the amount of torque which is to be provided to the vehicle's drive train. Controller 70 then generates commands to the appropriate subsystems or controllers such as PCU 22 and TMU 54 which selectively provide the desired torque to the drive train. Particularly, VSC 70 determines the total amount of torque which is to be provided or delivered to drive train and partitions or divides the torque among the various subsystems.

Each controller 22, 54, 70 includes one or more microprocessors and/or integrated circuits which cooperatively control the operation of the propulsion system 10.

In operation, VSC 70 receives commands, data, and/or signals from driver operated controls and from vehicle sensors 53. Based upon this received data, controller 70 calculates or determines the overall amount of torque which is being demanded or requested by the driver/user of the vehicle. Upon determining the desired or demanded torque, controller 70 communicates control signals, effective to cause engine 12, generator 42 and traction motor 63 to cooperatively provide the demanded torque to drive train. VSC 70 further monitors the speed of engine 12 and selectively and controllably activates generator 42 and clutch assembly 52 to hold or maintain the speed of engine 12 at a desired level, range or value. This may be done in addition to, or in lieu of, the torque produced by the generator motor production of electricity.

In certain operating conditions of a HEV, it may be desirable to provide drive torque from the engine. Before such torque requests can be made of the engine, however, it must be determined whether the engine is running.

The starting process of engine 12 is initiated by a command from the VSC 70 in response to a key placed in the ignition position or as determined by the VSC's optimal operating scheme for delivering the driver requested torque. In response, energy storage device 58 provides electrical power for motor/generator 42. The motor/generator 42 rotates the rotor which in turn rotates crankshaft 51 of engine 12. During the startup process, VSC 70 commands the generator 42 to control speed to a target value. In doing so, the engine is spun to a proportional fixed speed. Since the generator 42 is using energy in the process, the generator torque ($T_G$) is negative.

When the rotor of the motor/generator reaches the target speed and thus the engine reaches its target speed, the PCU 22 starts the engine 12 by supplying fuel through fuel pump 16 and injectors 17 and controlling the spark timing through spark plugs 20. Thus, upon the target engine speed being achieved, the VSC 70 triggers the starting of the combustion process in the engine. As the engine begins generating torque due to the combustion process, the required torque of the motor generator 42 becomes "less negative" to maintain the target speed. In other words, the generator torque decreases in the negative or "consuming" energy region, and then increases in the positive or "generating" energy region.

Once the crankshaft reaches the desired speed and the engine combustion process is initiated, the motor/generator 42 can be used in a generating mode.

Figure 2:
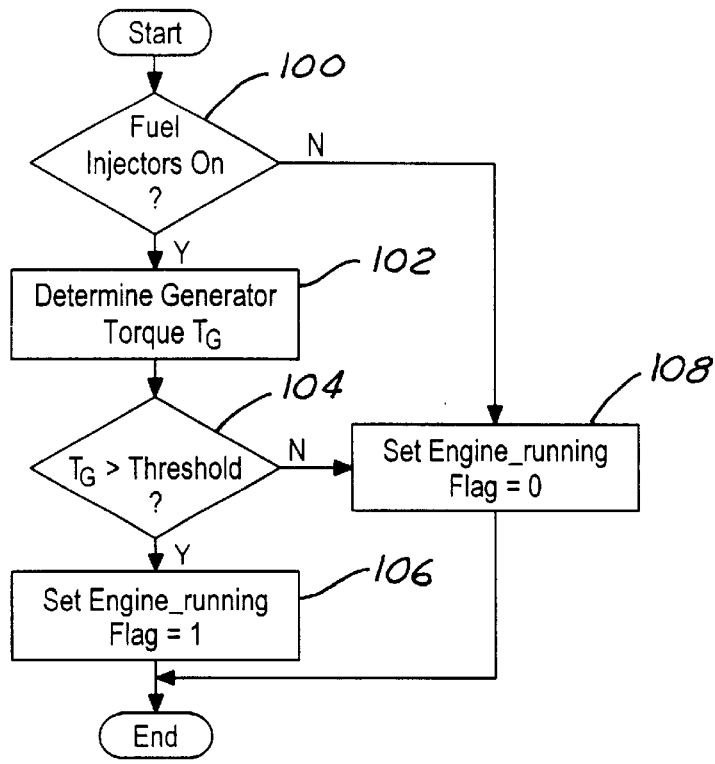
FIG. 2 shows a logic flow diagram of one method of determining an engine running condition according to the present invention.

FIG. 2 shows a logic flow diagram of one method of determining an engine running condition according to the present invention. Preferably, the logic is contained in the PCU 22, although it could also reside in the VSC 54. In step 100, the PCU queries the status of fuel injectors. If the fuel injectors are commanded ON, the logic continues to step 102, otherwise, the routine continues to step 108.

In step 102, the generator torque, as measured by the motor/generator, is determined and is stored as variable $T_G$. The generator torque, $T_G$, is determined by measuring electrical current flowing out of the generator. The torque is directly proportional to the current. Current measurement is accomplished with sensors. In step 104, it is determined whether the engine is producing torque. This is accomplished by comparing the generator torque $T_G$ to a predetermined threshold value. If the generator torque is more than the threshold value, then it follows that the engine is producing torque.

Figure 3:
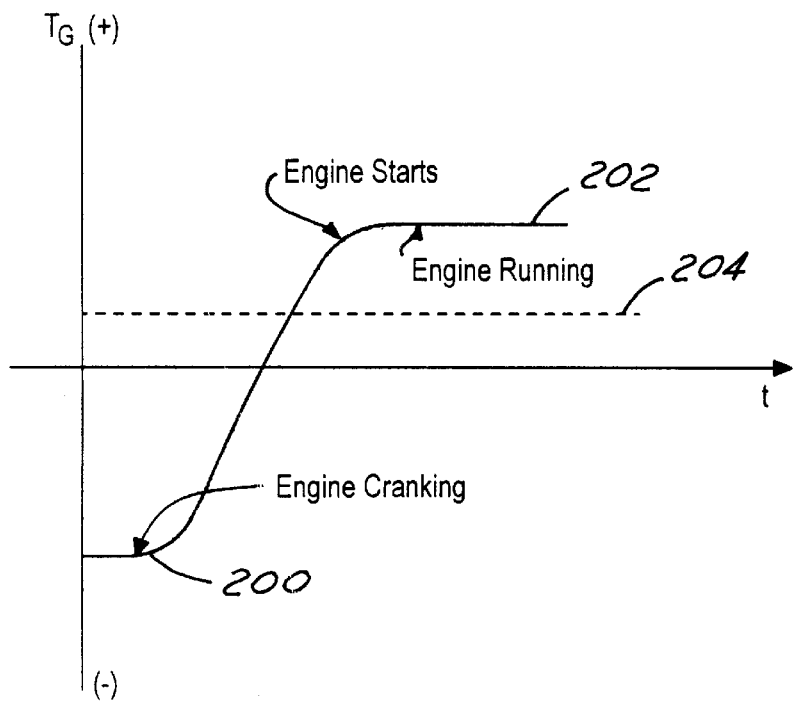
FIG. 3 shows a crankshaft torque graph for different operating states according to the present invention.

FIG. 3 shows the generator torque for the different operating modes of the present invention. For example, when the motor/generator is being used to motor the engine, it is producing a negative torque value such as shown in region 200 of FIG. 2. When the engine is running as shown in region 202, however, the generator will be receiving torque from the engine and indeed, will be functioning as a generator and have a positive torque associated therewith. Thus, in step 106, if the fuel injectors are commanded ON and the generator torque is greater than a predetermined value 204, it is determined that the engine is started and is running. Accordingly, the Engine_running flag in the PCU is set equal to 1. In step 108, if neither condition is met, the Engine_running flag is cleared (set equal to 0), and the routine terminates.

In another aspect of the invention, the engine torque can be inferred from the measured generator torque in step 102. In such a case, the engine torque can be determined from the gear ratio between the engine and the generator. If $T_E$ represents engine torque, $T_G$ represents generator torque, and K is a constant representing the gear ratio relationship between the engine and generator, then the engine torque can be determined from $T_E = K*T_G$. This inferred engine torque can then be compared to a calibratable threshold for engine torque and, if the engine torque exceeded the threshold, it would indicate that combustion is occurring and that the engine is ready to be controlled in a torque-based control manner. Alternatively, it can be determined whether the inferred engine torque is within a calibratable range of the commanded engine torque and, if so, it would indicate that combustion is occurring and that the engine is ready to be controlled in a torque-based control manner.

While particular embodiments of the invention have been shown and described, numerous variations and alternate embodiments will occur to those skilled in the art. Accordingly, it is intended that the invention be limited only in terms of the appended claims.

What is claimed is:

1. In a hybrid electric vehicle drive system comprising an internal combustion engine having an output shaft which is coupled to a generator, said engine including a fuel injector responsive to a fuel command, a method of determining an operating state of said engine comprising the steps of:

determining an ON/OFF status of said fuel command;

determining a torque value of said generator; and setting an engine running indicator when said fuel command is ON and said generator torque value is greater than a predetermined value.

2. The method of claim 1 wherein the step of setting an engine running indicator includes the step of setting the engine running indicator ON when said fuel command is ON and said generator torque value is greater than a predetermined value, otherwise setting the engine running indicator OFF.

3. A method of determining an operating state of an internal combustion engine in a hybrid electric vehicle wherein an output shaft of said engine is coupled to a generator, said engine responsive to a commanded torque value and including a fuel injector responsive to a fuel command, the method comprising the steps of:

determining an ON/OFF status of said fuel command;

determining an engine torque value indicative of the torque produced by said engine; and setting an engine running indicator when said fuel command is ON and said engine torque value is greater than a predetermined value.

4. The method of claim 3 wherein the step of setting an engine running indicator includes the step of setting the engine running indicator ON when said fuel command is ON and said actual engine torque value is within a predetermined range of values of the commanded engine torque, otherwise setting the engine running indicator OFF.

5. The method of claim 3 wherein the step of setting an engine running indicator includes the step of setting the engine running indicator ON when said fuel command is ON and said engine torque value is greater than a predetermined value, otherwise setting the engine running indicator OFF.

6. The method of claim 3 wherein the step of setting an engine running indicator includes the steps of setting the engine running indicator ON when said fuel command is ON and a difference between said actual engine torque value and the commanded engine torque is less than a predetermined value.

7. The method of claim 6 further comprising the step of setting the engine running indicator OFF when said fuel command is OFF or the difference between said actual engine torque value and the commanded engine torque is greater than said predetermined value.

8. The method of claim 3 wherein the step of determining an actual engine torque value includes the step of determining a generator torque value.

9. The method of claim 8 wherein the step of setting an engine running indicator includes the step of setting the engine running indicator ON when said fuel command is ON and said generator torque value is within a predetermined range of values of the commanded engine torque, otherwise setting the engine running indicator OFF.

10. The method of claim 8 wherein the step of setting an engine running indicator includes the steps of setting the engine running indicator ON when said fuel command is ON and a difference between said generator torque value and the commanded engine torque is less than a predetermined value.

11. The method of claim 10 further comprising the step of setting the engine running indicator OFF when said fuel command is OFF or the difference between said generator torque value and the commanded engine torque is greater than said predetermined value.

12. A hybrid electric vehicle system comprising:

an internal combustion engine having a crankshaft, said engine responsive to a commanded engine torque and including a fuel injector responsive to a fuel command;

a generator which is operatively coupled to said crankshaft; and a controller communicatively coupled to the generator and engine, said controller adapted to provide said commanded engine torque and said fuel command and determine a generator torque wherein said controller sets an engine running indicator when said fuel command is ON and said generator torque is greater than a predetermined value.

13. A system as recited in claim 12 wherein said controller sets the engine running indicator ON when said fuel command is ON and said generator torque is greater than a predetermined value, and otherwise sets the engine running indicator OFF.

14. A system as recited in claim 12 wherein said generator comprises a motor/generator.

* * * * *